United States Patent
Allen et al.

(10) Patent No.: US 6,915,429 B1
(45) Date of Patent: Jul. 5, 2005

(54) SYSTEM AND METHOD FOR FIBER CHANNEL REMOTE ACTIVATION AND ENHANCED SECURITY

(75) Inventors: James P. Allen, Austin, TX (US); Marcus Bryan Grande, Austin, TX (US); Robert G. Kovacs, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 985 days.

(21) Appl. No.: 09/714,736

(22) Filed: Nov. 16, 2000

(51) Int. Cl.$^7$ ............................ H04L 9/00; H04B 10/08; H04B 17/00; H04B 10/00; H04J 14/00

(52) U.S. Cl. ...................... 713/170; 380/256; 398/45; 398/166

(58) Field of Search ................................ 398/45, 30, 37, 398/57, 113, 116, 166; 713/170, 200, 201; 380/256

(56) References Cited

U.S. PATENT DOCUMENTS 5,978,379 A * 11/1999 Chan et al. .................. 370/403
6,138,161 A * 10/2000 Reynolds et al. ........... 709/227

* cited by examiner

Primary Examiner—Gilberto Barrón, Jr.
Assistant Examiner—C. Stulberger
(74) Attorney, Agent, or Firm—Van Leeuwen & Van Leeuwen; Joseph T. VanLeeuwen; Diana Gerhardt

(57) ABSTRACT

A system and method for remotely waking up a Fibre Channel attached device. A Fibre Channel attached device is set in a quasi-open mode wherein the device summarily rejects most requests and allocates a minimal set of resources to operate the adapter. One request that is not rejected is an activation request received from another Fibre Channel attached device. When an activation request is received, an optional authentication process can be invoked to insure that only authenticated devices issue the activation command. An additional security feature can be used to restrict the devices authorized to activate a device. A list of devices can be stored on nonvolatile storage or in memory. When a requesting device has been authenticated, its address is checked against the list of approved devices before the device adapter is activated.

14 Claims, 14 Drawing Sheets

SYSTEM AND METHOD FOR FIBER CHANNEL REMOTE ACTIVATION AND ENHANCED SECURITY

RELATED APPLICATIONS

This application is related to the following co-pending U.S. Patent Application filed on Aug. 31, 2000 and having the same inventors and assignee: "System and Method for Efficient Management of Fibre Channel Communication" by Allen, Grande, and Kovacs (application Ser. No. 09/652, 370.

BACKGROUND OF THE INVENTION

1. Technical Field

The present invention relates in general to a method and system for using a Fibre Channel. More particularly, the present invention relates to a system and method for securely waking up a Fibre Channel device using a remote device connected to the Channel.

2. Description of the Related Art

Computer systems in general and International Business Machines (IBM) compatible personal computer systems in particular have attained widespread use for providing computer power to many segments of today's modern society. Computer systems typically include a system processor and associated volatile and non-volatile memory, a display area, input means, and often interfaces, such as a network interface or modem, to other computing devices.

One of the distinguishing characteristics of these systems is the use of a system board to electrically connect these components together. These computing devices are information handling systems which are designed primarily to give independent computing power to a single user, or a group of users in the case of networked computing devices. Personal computing devices are often inexpensively priced for purchase by individuals or businesses. Nonvolatile storage devices such as hard disks, CD-ROM drives and magneto-optical drives are considered to be peripheral devices. Computing devices are often linked to one another using a network, such as a local area network (LAN), wide area network (WAN), or other type of network. Computer systems can also be interconnected using a Fibre Channel network. By linking to other computer systems, a computing device can use resources owned by another computing device. These resources can include files stored on nonvolatile storage devices and resources such as printers and storage area networks (SANs).

Data Storage has become an increasingly important issue for business people and IT professionals. Organizations store records in databases regarding customers, products, competitors, and other records. This storage space becomes expensive when more data is stored. These expenses can be potentially prohibitive for small businesses who must employ people to manage the data, purchase storage equipment and software, and ensure that the data is properly protected from disaster or storage device failure. A solution to this problem comes in the form of an emerging technology called Fibre Channel. Fibre Channel can be used to connect devices to each other, including connecting computer systems to storage devices such as SAN devices.

Fibre Channel is a high speed (100 to 1000 Mbps currently, with speeds increasing quickly over time) medium used for data transfer and storage. It is essentially a serial data channel preferably created over fiber optic cabling.

Fibre Channel provides a logical bi-directional, point-to-point connection between a host and a device. Similar to networking technologies using local area network (LAN) or wide area network (WAN) configurations, Fibre Channel also is used to connect PCs, servers, printers, and storage devices. Because Fibre Channel allows the use of fiber optic cabling, connections along a Fibre Channel network makes it possible to transfer data at greater distances. In addition, Fibre Channel makes high-speed data transfers possible. Fibre Channel also provides increased bandwidth over communication channels.

Channels and networks are the two primary ways that data is transferred between devices. Such devices include processors and peripherals such as printers and storage devices. Channels transfer data through switched or direct point to point connections. Channels work by creating a fixed connection between the source and destination devices until the transfer is complete. Channels transfer data at high speeds and are very economical. Networks (i.e., LAN or WAN), on the other hand are collections of nodes such as processors, print devices, and workstations. Connections on networks are typically slower than those made via channels. Also, because networks are software intensive, they are much more expensive due to upgrade and compatibility issues. Channels work best among few devices and connect via predefined addresses. Networks, on the other hand, can handle multiple requests among multiple connections.

Fibre Channel is hybrid of both network and channel methods. Consequently, Fibre Channel is often considered a new I/O (input/output) interface that combines the best of networks and channels. In addition, Fibre Channel systems can be configured in different ways depending on needs of the user, thus providing flexibility in an ever changing systems environment.

Devices are connected on Fibre Channel systems using various interconnection topologies. Interconnection devices available for use on Fibre Channel are switches, hubs, and bridges. The ability of Fibre Channel to use different interconnect devices makes it scalable depending on user needs. For small Fibre Channel networks, hubs and bridges may be used for connecting devices in a topology called Fiber Channel Arbitrated Loop (FC-AL). As Fibre Channel networks get larger and network demands increase, switching may be implemented. A switched Fibre Channel network is called a "fabric." A fabric is simply the underlying switching architecture used by a Fibre Channel switch. A fabric may contain many loops interconnected with switches.

SCSI (Small Computer System Interface) is a common storage interface for I/O systems. However, SCSI environments have challenges, including limited bandwidth, limited distances, and limited device connections. An advantage of Fibre Channel is increased transmission speed and transmission distance. Data can be sent over longer distances using Fibre Channel because of fiber optic cabling, whereas SCSI only allows data transfers at distances up to 30 meters. Another advantage of Fibre Channel is that it allows millions of device connections, whereas SCSI adapters are usually allowed only eight to sixteen device connections.

Although the ideal medium for Fibre Channel is fiber optic cabling, Fibre Channel can also be used with a variety of cable types such as copper, coaxial cables or Unshielded twisted pair (UTP) wires. Fiber optic cabling is generally preferred on a Fibre Channel system for purposes of increased speed and reliability. Fiber optic cabling works by using photons to transmit digital signals. A laser light connected to a device pulses in binary format (0's and 1's).

A light emitting diode (LED) codes and transmits the signal from one end of the cable. This signal is subsequently decoded at the other end of the cable by a photo-detector connected to the receiving device. Fiber optic cables do not have the same challenges that are associated with copper cabling. These challenges include attenuation (loss of signal strength) and noise. Fiber optic cables are also more secure than copper cables because crosstalk does not occur with Fiber optic cables (crosstalk is interference caused by a signal transferring from one circuit to another, as on a telephone line). This insures that data being transferred across a network gets to its destination intact which makes the stored data more reliable for the user.

Fibre Channel technology makes use of classes of service to define messaging types (communication between devices). According to the ANSI standard, a Fibre Channel system's classes of service can be 1, 2, 3, 4 or 6. These classes make it possible to configure Fibre Channel systems according to the needs of the users.

In a class 1 configuration, there is a dedicated channel between two connection devices. In this configuration, if a host and a device are connected, no other host uses the connection. The advantage of using service class 1 is speed and reliability which is an excellent combination for mass storage use such as in a data library. Class 2 is known as a "connectionless" service. Class 2 provides a frame-switched link that guarantees delivery of packets from device to device. It also provides packet receipt acknowledgments. In this configuration, bandwidth is shared among several devices, as there is no dedicated link. The third Fibre Channel service class (Class 3) is called "unacknowledged connectionless service" and is often used for messages that do not need to be acknowledged, as there is no acknowledgement with a Class 3 configuration. Class 4 is called "fraction bandwidth connection oriented" and allows a device to reserve a portion of the overall bandwidth and use the reserved portion to create a dedicated channel between devices (similar to Class 1, except only part of the available bandwidth is used for the dedicated channel). Class 6 is called "multicast" and is used for one-to-many broadcast communications over the Fibre Channel network. There is an additional Fibre Channel service class called "intermix," which creates a dedicated connection like that of class one, but it also allows class 2 traffic to access the link. This method is efficient and allows for greater bandwidth because more than one connection can access the system at any time.

The Fibre Channel Structure, or architecture, is set forth in the table below. The layers in the table represent a different function that exists within a Fibre channel system.

| Layer | Function |
| --- | --- |
| FC-0 | Physical characteristic specifications |
| FC-1 | Encoding/Decoding |
| FC-2 | Data Transfer Sequence Management/Data Framing |
| FC-3 | Bandwidth Management |
| FC-4 | Application/Protocol Management |

FIG. 1 shows various topologies that are used with Fibre Channel. These topologies include Loop topology 110, Point-to-Point topology 120, and Fabric topology 100. Within these topologies, several connection types can exist between two Fibre Channel nodes. These include point-to-point connections, cluster connections, and switched connections. Point-to-point connections are typically used for high-speed connections at maximum distances. In this type of connection, no other device accesses the connection while two devices are communicating. Cluster connections connect multiple devices such as workgroup clusters, while switched connections allow more than one simultaneous connection of devices. A transceiver is a device that connects cabling to devices on any network or system and makes data transmission possible between devices.

Fabric topology 100 permits multiple paths between two ports on the Fabric. Loop topology 110, on the other hand, uses one active circuit at a time. Loop and fabric topologies can be combined. In addition, a fabric may contain one or more loops. If a link in a point-to-point topology 120 fails, communication between that pair of ports stops, while communication between other point-to-point connected Ports continues.

Fabric topology 100 includes a switch or a network of switches. These switches create the connections between devices in order for frames to be transported between the connections based on specifying a destination identifier (ID). If the destination ID is determined to be invalid, the fabric rejects the transmission. The function of the Fabric is similar to that of a telephone system, which provides a complete, low-cost connectivity solution. Fibre Channel establishes temporary, direct, and full-bandwidth connections between devices. Fibre Channel makes use of unique address identifiers, similar to telephone numbers, to connect processors to other processors or peripherals at distances currently reaching up to 10 km.

Storage Area Networks are increasing in popularity due to high demand by users who need to store large volumes of data. In addition, the cost of magnetic media that comprise Storage Area Networks continues to fall, thus making large data networks both attractive and feasible. The data in a Storage Area Network might be used in data warehouses or decision support systems used by businesses. There are also new applications for Storage Area Networks such as fault tolerant RAID clusters. Storage Area Networks can operate using network interconnect devices such as SCSI, Fibre Channel, HIPPI, or Sonnet. A SAN is a group of storage devices connected via a network of connections to hosts machines across greater distances than are possible on a traditional LAN. Storage Area Networks enable users to store large volumes of data at remote locations. These remote locations, called libraries, make it possible for businesses to store their data, whether for the purpose of creating backups or moving data management away from the primary site. If used for storage, a SAN will typically contain many high capacity Redundant Arrays of Inexpensive Disks (RAID) devises configured for the specific interconnect device used on the SAN. Other types of data that can be stored on SAN devices include databases, video, and streaming media. On a Storage Area Network using a Fibre Channel interconnect, backups can be performed throughout the workday, thereby eliminating timely and costly after hours backups. Storage Area Networks eliminate bottlenecks that make it difficult to access data on traditional networks.

Fibre Channel Arbitrated Loop Specification (FC-AL), provides for Loop Initialization Primitives (LIPs) to occur whenever a new device enters the loop (or Fabric as Fabrics often include one or more loops). LIPs are basically messages directing all other devices on the loop to stop the current processing activity because something on the loop topology has changed (i.e., a new device has been powered on, a device has entered or left the loop, etc.). When a LIP occurs, each device updates their internal maps identifying the various devices on the loop. LIPs are necessary because each device on a Fibre Channel loop needs to know target device addresses in order to establish dedicated circuits. When the LIP sequence completes, each device resumes the activity they were performing before the LIP sequence was initiated. In some implementations on a loop or fabric, each time the Fibre Channel adapter for any device is opened or closed, the laser light on the adapter is turned on and off causing another LIP sequence. Increasing the number of devices on the loop exacerbates the condition by causing more LIPs. LIPs interrupt all devices connected to the loop. Often a LIP will be initiated even though the adapter on the LIP-causing device does not enter or leave the loop, only the light on the adapter was toggled causing a LIP condition.

When a device is connected to a Fibre Channel loop, it is in one of two modes—"participating mode" or "non-participating mode." A device may have multiple logical ports connected to the Fibre Channel loop. A device's logical port is in participating mode when it has acquired a physical address. A device acquires a physical address through an initialization process. A logical port that is in participating mode may voluntarily relinquish control of its physical address and enter nonparticipating mode. This allows another logical port to use the physical address. A device's logical port is in nonparticipating mode when it does not have a valid physical address. Reasons for not having a physical address may be that the logical port was unable to obtain a physical address, the logical port voluntarily does not participate, or the logical port has been bypassed and has recognized a LIP. Nonparticipating mode is the default operational mode for a logical port.

Before a logical port can send data through the Fibre Channel loop, it must arbitrate for the loop. In order to do this, the logical port sends an arbitrate (ARB) message across the loop. A priority scheme determines which logical port receives the loop if multiple nodes request the loop at the same time. When a device's logical port receives ownership of the loop, the device can communicate with another port on the loop.

When a new port wants to enter the loop (enter participating mode), the FC_AL specification states that the device's logical port will send out a LIP indicating such. Any operations that were being performed on the loop are suspended. This means that devices that were transferring data on the loop must stop what they were doing and participate in the initialization sequence. The purpose is to assign a physical address to the new logical port. Next, a device on the loop is chosen as the loop master to manage the initialization and coordinate the selection of a physical address for the new port. Optionally, a positional map is generated and propagated to all devices on the loop. At this point, the loop master issues a CLS primitive and finally IDLE primitives, which inform the devices attached to the loop that they can resume normal operations. The device that owned the loop before the initialization took place has to arbitrate again for the loop.

The reason the initialization process is performed is because an addition/deletion to the loop is a state change. It may be that a target device was removed from the loop and, consequently, the corresponding physical address disappears. In addition, a target device intended for future communications may have been removed. If initialization was not performed, a device may attempt to communicate with a nonexistent device.

When LIPs occur, the internal state machine of the FC-AL device enters into the OPEN-INIT state, which is the state that is used to deal with initialization/address assignment. When it is doing normal I/O, it is in the "loop circuit" state. The device cannot be in two states at once as the hardware operates in one state at a time. Performing LIPs/address assignment and normal I/O at the same time would require simultaneous use of two states, which is not possible. When the fiber optic laser connected to a device's Fibre Channel adapter turns on and off, the toggled light is interpreted as entering or leaving the loop, thus causing a LIP condition.

In short, state changes on the loop have to be dealt with immediately because they are major events on the loop. State changes can affect current or future I/O operations. The FC-AL protocol allows for only two devices to use the loop at the same time. Interleaving normal I/O messages and LIPs on the loop is not allowed or supported by the protocol.

FIG. 2 shows two devices in the prior art connecting to Fibre Channel Fabric 220. Device 200 is shown in closed 200 status. When a device, such as device 200, is in a closed state, a connection no longer exists between the device and the Fibre Channel fabric. Device 250 is shown being in opened 240 status. Because device 230 is in the open state, a connection exists between it and Fibre Channel Fabric 220. When the connection is open, request 250 can be transmitted to device 230. Device 230 can process request 250 and send response 260 to another device connected to Fibre Channel Fabric 220. Other devices that may be connected to Fibre Channel Fabric include disk storage device 270 and tape device 280.

FIG. 3 shows what happens when device 300 toggles between open state 310 and closed state 320. Other device 360 sends request 330 to device 300 through Fibre Channel Interconnect 350. If device 300 is in open state 310, it processes the request and sends response 340 to a target device through Fibre Channel Interconnect 350. Because other device 360 performs Fibre Channel Re-initialization whenever device 300 toggles between open state 310 and closed state 320, other device 360 does not send request 330 to device 300 when device 300 is in closed state 320. However, having other devices perform Fibre Channel re-initialization each time any device connected to Fibre Channel Interconnect changes states is costly in terms of efficiency and throughput. In fact, certain devices, such as switches, may disconnect a Fibre Channel loop when the number of re-initializations exceeds a threshold, as high numbers of re-initializations may indicate that the loop is experiencing difficulties.

Remote Wakeup and Security

Connections to traditional Fibre Channel connected devices are usually either open or closed. Because closed devices are removed from the Channel, a second device on the Fibre network is unable to request that the first device open its connection to the network. Some Fibre Channel devices, such as Fibre Channel hosts or disks, might need to be reconnected remotely from another device. A challenge with current Fibre Channel technology is communicating with a device that is not connected to the network. One way this could be accomplished is using a non-Fibre form of technology, such as a modem. A challenge, however, is providing multiple communication paths to a Fibre Channel device in order to provide a remote wakeup, or activation, capability. In providing a remote activation capability for Fibre Channel connected devices, as discussed herein, a further challenge is to ensure that security is maintained so that unauthorized devices are unable to remotely activate the device.

A challenge, therefore, with Fibre Channel connected devices is being able to remotely activate a Fibre Channel connected device using the Fibre Channel communication path to send the activate request. A second challenge is to provide the activation command securely so that only authenticated, or authorized, devices are able to request a wakeup. Consequently, what is needed is a system and method for securely activating a Fibre Channel connected device.

SUMMARY

It has been discovered that providing a system and method for opening and closing the Fibre Channel connection without causing a LIP condition to occur improves individual system, as well as overall network, performance. When a close request is received by the adapter, the adapter enters a quasi-open state rather than actually closing the adapter. The quasi-open state keeps the link between the adapter and the Fibre Channel network open by maintaining a minimal set of resources allocated. Extended resources, needed to operate in open mode, are released.

While operating in quasi-open mode, the adapter sends a "rejection" message to any devices that attempt to communicate with it. The rejection message informs other devices that the device is not currently communicating on the Fibre Channel network. Three possible states now exist for the adapter: (i) an open state wherein the adapter receives requests, processes the requests, and sends responses to the requests; (ii) a quasi-open state wherein the adapter is capable of receiving requests since the link is open but summarily rejects received requests; and (iii) a closed state wherein the adapter is no longer linked to the Fibre Channel network and therefore neither receives nor sends data across the network. In a preferred embodiment, the adapter toggles between the open and quasi-open states in order to avoid the close state, and consequently avoid causing LIP conditions on the Fibre Channel network.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
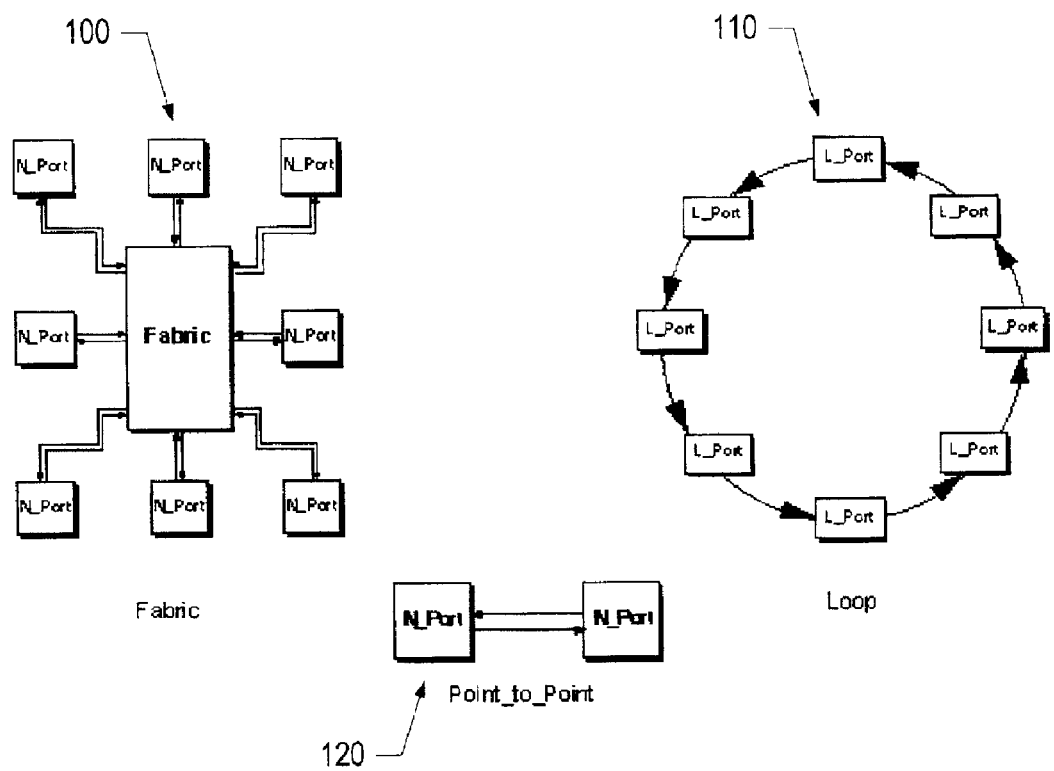
FIG. 1 (prior art) shows three Fibre Channel topologies used to connect devices.
Figure 2:
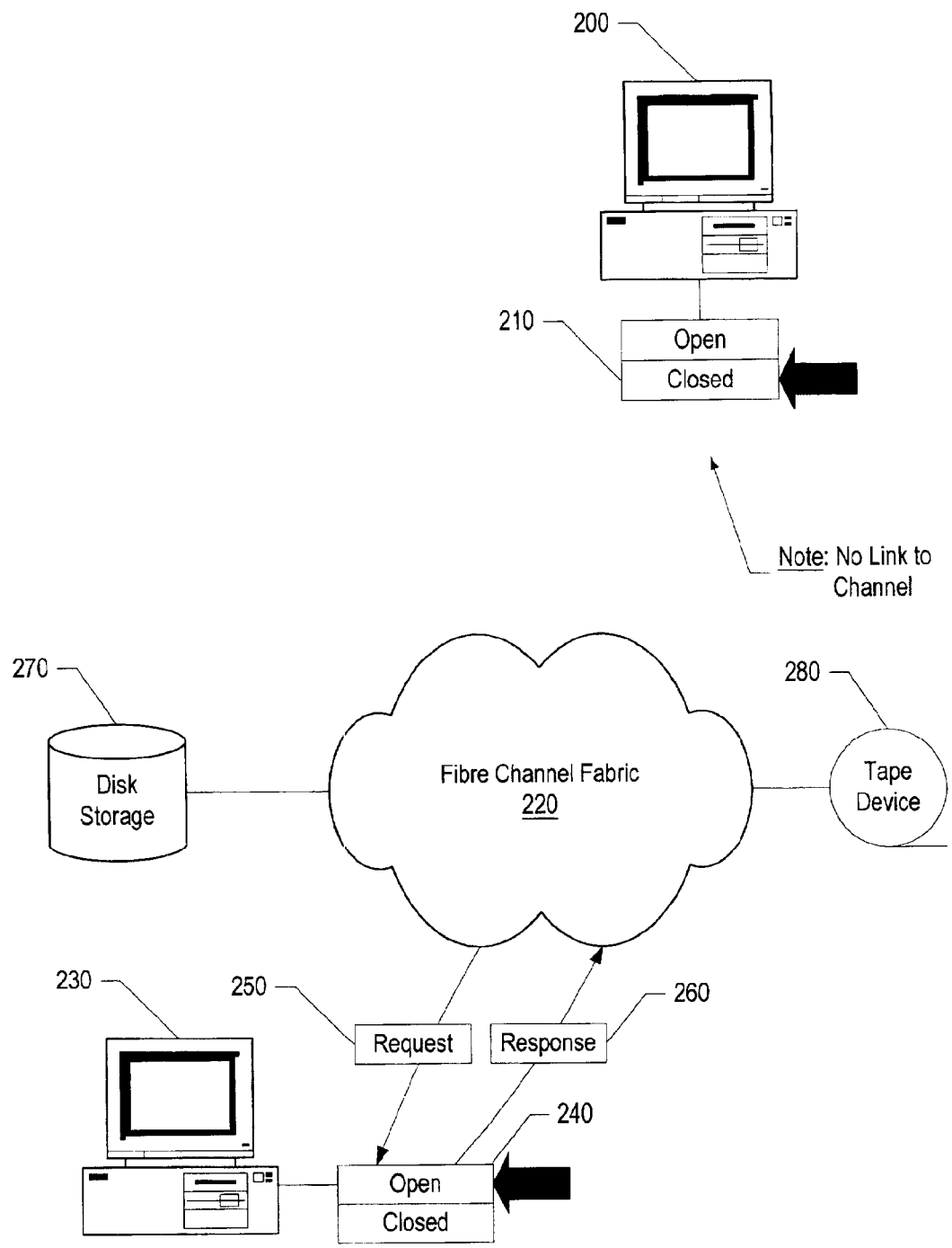
FIG. 2 (prior art) shows and open and a closed device from a system perspective on a Fibre Channel fabric.
Figure 3:
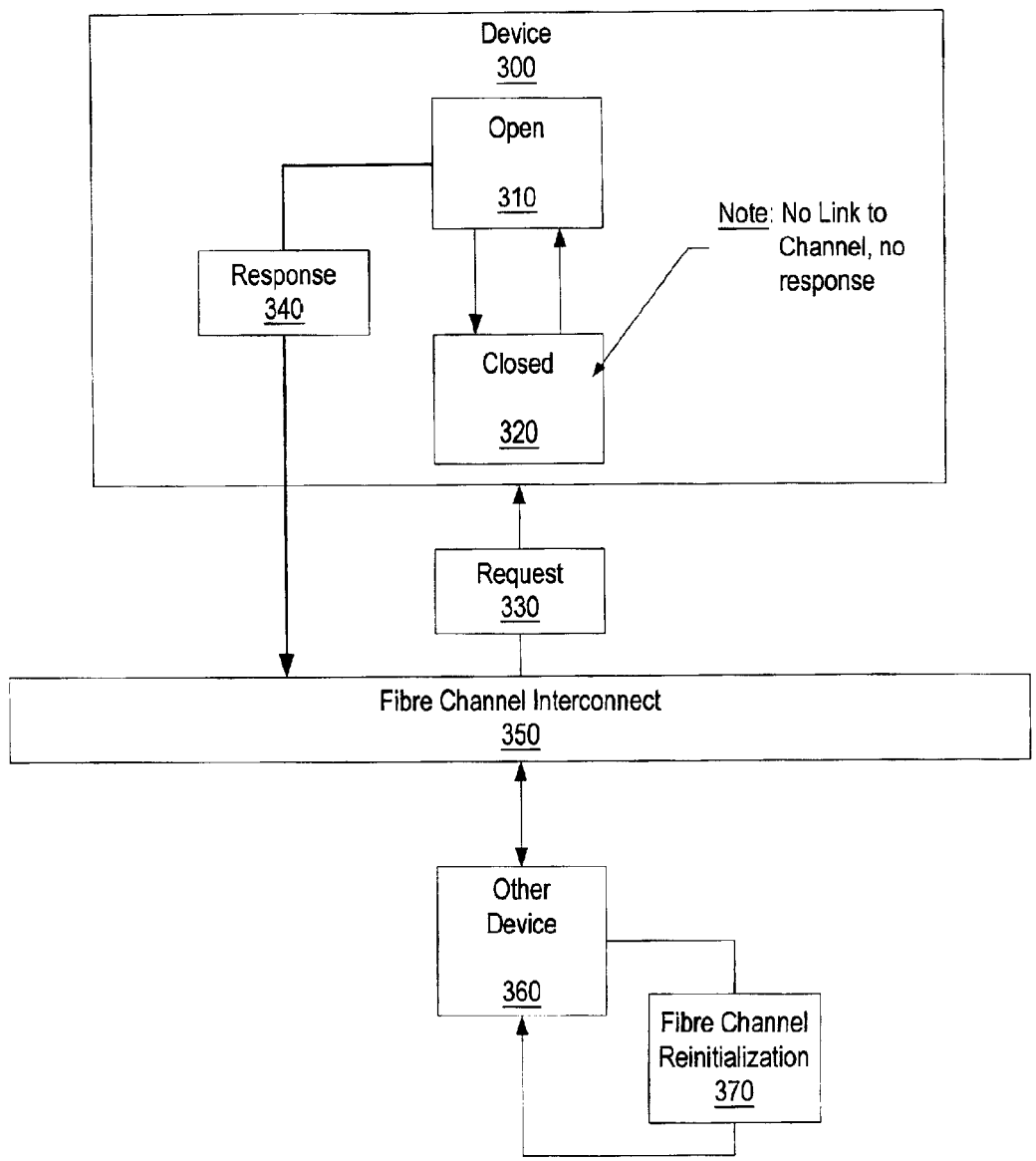
FIG. 3 (prior art) shows a block diagram of the effect on other devices of a device connected to a Fibre Channel Interconnect toggling between open and closed states.

FIGS. 1–3 show aspects of the prior art and are described in the Description of the Related Art subsection found in the Background section above.

Quasi-Open Fibre Channel State

FIGS. 4–8 show a quasi-open implementation allowing Fibre Channel connected devices to remain connected to a Fibre Channel without allocating typical Fibre Channel resources.

Figure 4:
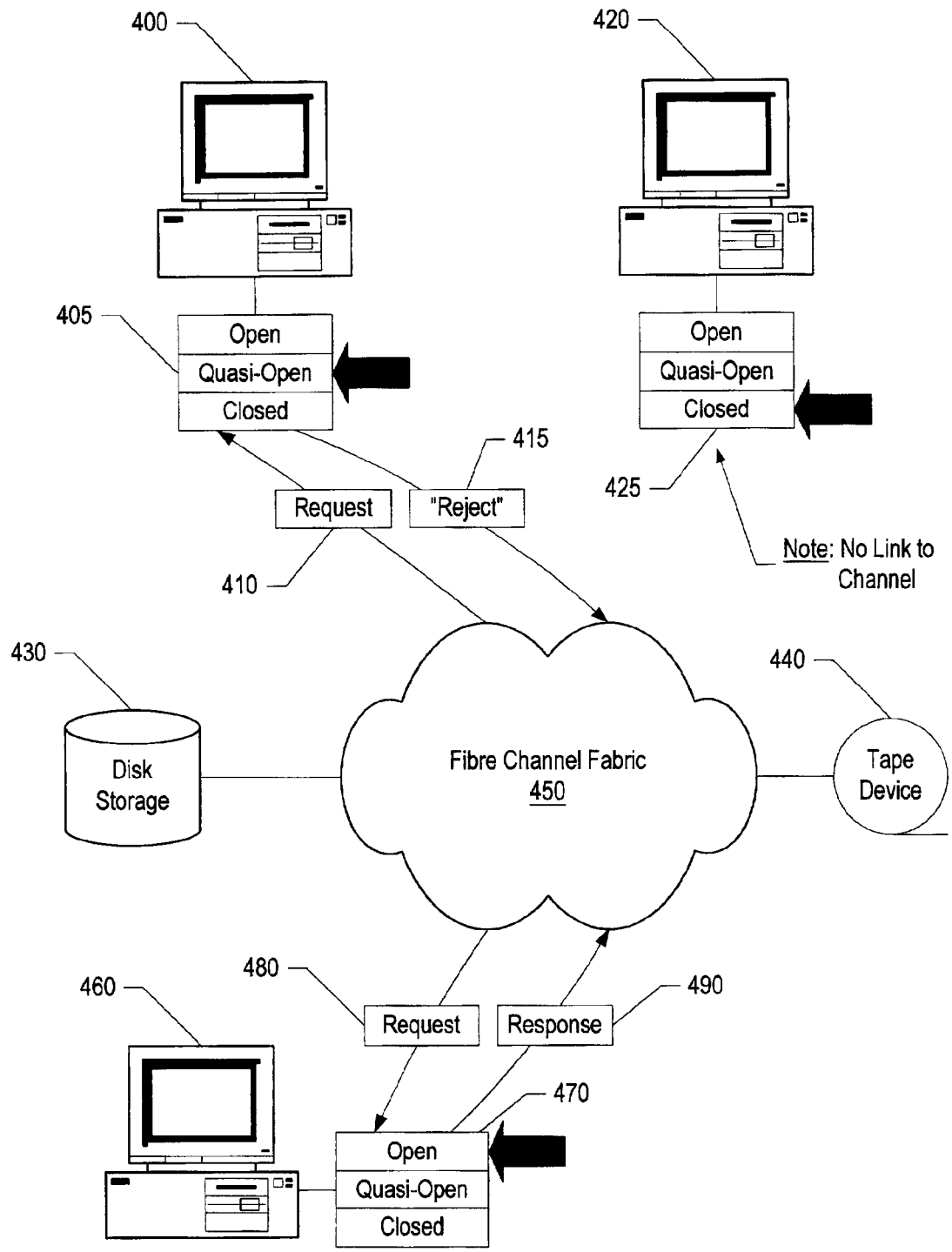
FIG. 4 shows an open, a closed, and a "quasi-open" device from a system perspective on a Fibre Channel fabric.

FIG. 4 shows Fibre Channel Fabric 450 with devices 400, 420, and 460. Device 460 is shown in open state 470. Because device 460 is in open state 470, it receives request 480 from another device attached to Fibre Channel Fabric 450, processes the request, and sends response 490 to a target device. Device 420, on the other hand, is shown in closed state 425. Because device 420 is in closed state 425, no link exists between device 420 and Fibre Channel Fabric 450. If device 420 was connected to Fibre Channel Fabric 450 and subsequently disconnected, all devices connected to Fibre Channel Fabric 450, such as devices 400 and 460, would need to re-initialize their internal maps regarding the devices present in Fibre Channel Fabric 450.

In contrast, device 400 is shown being in quasi-open state 405. In quasi-open state 405, device 400 allocates minimal resources needed to simply keep a link established with Fibre Channel Fabric 450. Because minimal resources are maintained, any request, such as request 410, received by device 400 is rejected as shown by reject message 415. Reject message 415 informs devices that attempt to communicate with device 400 that device 400 is not currently processing requests. Disk storage device 430 and tape device 440 are common target devices that may receive requests and data from another device connected to Fibre Channel Fabric 450.

Figure 5:
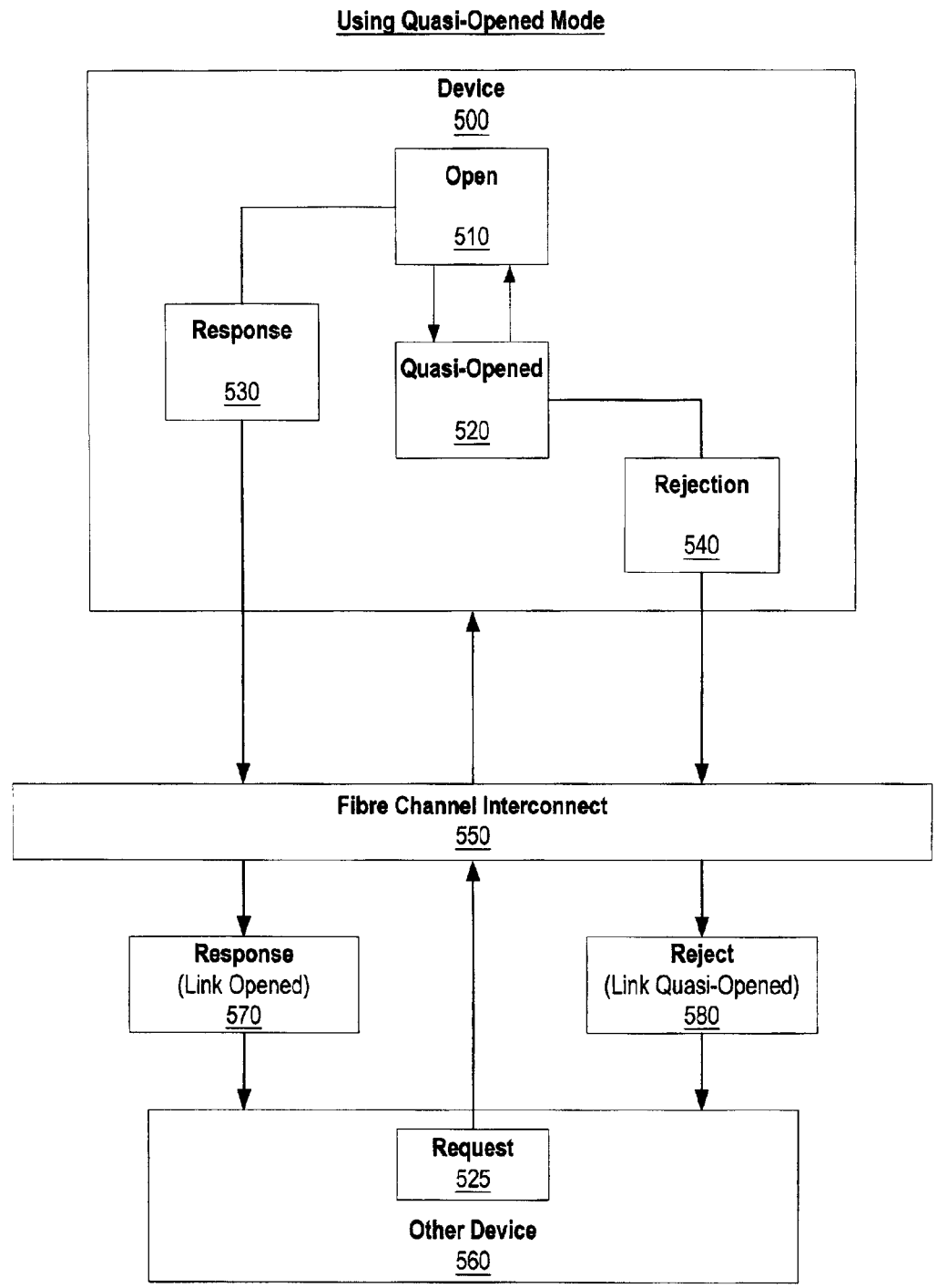
FIG. 5 shows the minimal effect on other devices of a device connected to a Fibre Channel Interconnect toggling between open and quasi-open states.

FIG. 5 shows device 500 toggling between open state 510 and quasi-open state 520. FIG. 5 also shows the minimal impact such toggling has on other device 560. Device 500 has a link established with Fibre Channel Interconnect 550. With a link established, the adapter light in device 500 is kept on when the device is in either open state 510 or quasi-open state 520.

Other device 560 prepares request 525 and sends it to device 500 through Fibre Channel Interconnect 550. Device 500 receives request 525. If device 500 is in open state 510, device 500 processes request 525 and sends response data 530 to other device 560. Other device 560, in turn, receives response frame 570 which also informs other device 560 that device 500 has an open link to Fibre Channel Interconnect 550 and is accepting requests.

On the other hand, if device 500 is in quasi-open state 520, device 500 prepares rejection 540 in response to receiving request 525. In this case, rejection frame 580 is received by other device 560 informing other device 560 that device 500 has a link that is only partially opened. In this manner, other device 560 refrains from sending further requests to device 500 until device 500's link is fully opened.

Figure 6:
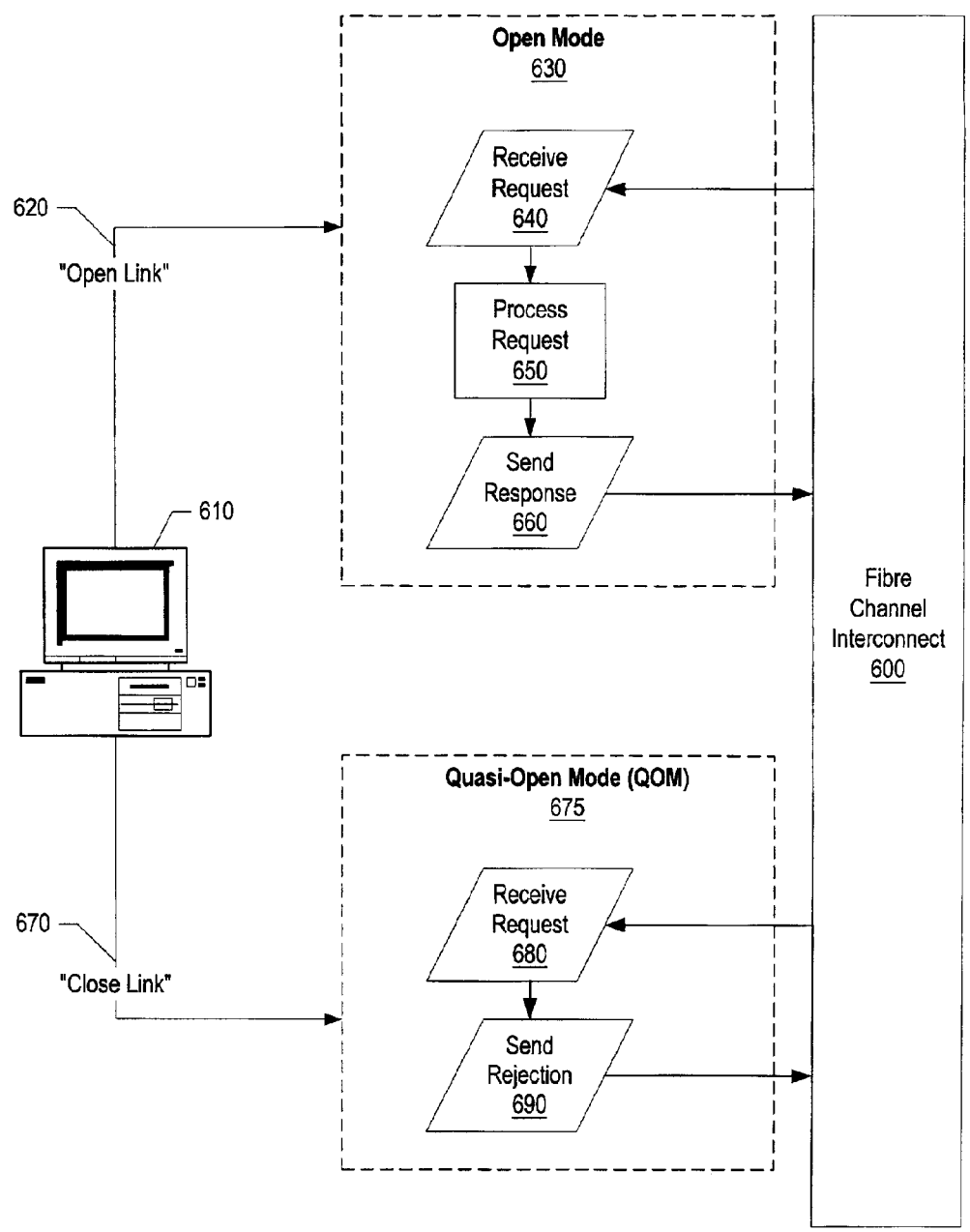
FIG. 6 shows processing performed by a device in either quasi-open or opened states.

FIG. 6 shows processing performed by device 610 in either quasi-open or open states. If device 610 is in an open state, open link branch 620 is taken leading to open mode processing 630. During open mode processing 630, a request is received (input 640) by device 610 from another device connected to Fibre Channel Interconnect 600. The request is processed to prepare a corresponding response (step 650). The response is then sent (output 660) to another device connected to Fibre Channel Interconnect 600. Open mode processing 630 continues until a request is received from device 610 to close the connection to Fibre Channel Interconnect 600.

When a close request is received, the adapter actually enters a quasi-open mode leaving the link to Fibre Channel Interconnect 600 open rather than actually closing the link between device 610 and Fibre Channel Interconnect 600. When device 600 has previously requested to close the connection, close link branch 670 is taken leading to quasi-open mode (QOM) processing 675. While in quasi-open mode, the link between device 610 and Fibre Channel Interconnect is actually open, however device 610 has requested that the link be closed and device 610 is not processing requests received from Fibre Channel Interconnect 600. During quasi-open mode processing 675, requests are received (input 680) from other devices connected to Fibre Channel Interconnect 600. However, rather than processing the request, device 610 simply returns a rejection message to the requesting device (output 690). Device 610 continues to reject all incoming requests until it enters open mode 630 whereupon incoming requests are processed and returned. In this manner, device 610 can continue to toggle between open mode processing 630 and quasi-open mode processing 675 while leaving the link between device 610 and Fibre Channel Interconnect active.

Figure 7:
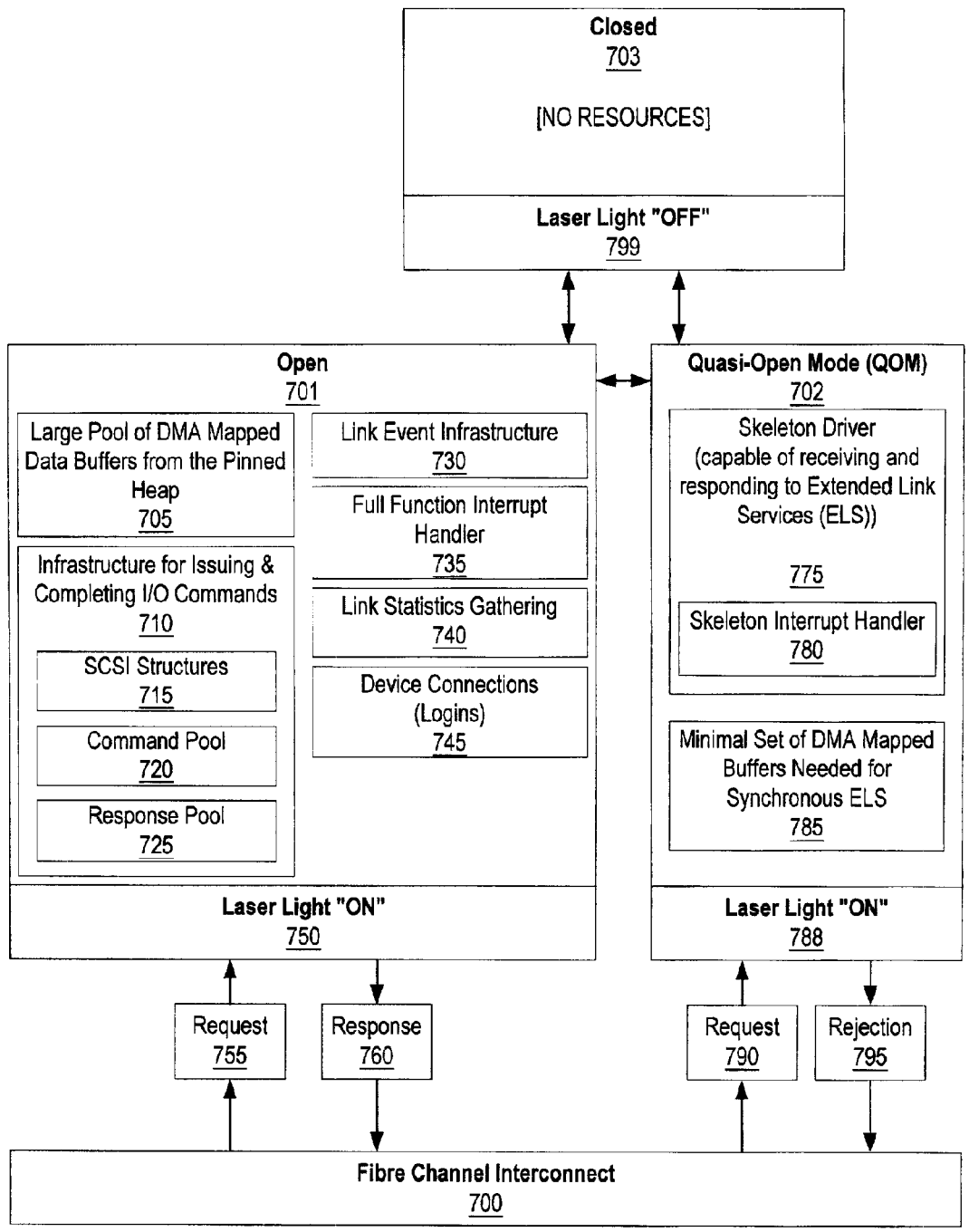
FIG. 7 is a block diagram of functions allocated by a device when in open, closed, and quasi-open states.

FIG. 7 shows a block diagram of resources allocated by a device when in open state 701, quasi-open state 702, and closed state 703. While in open state 701, the device allocates more resources than in either quasi-open mode or closed mode. In open mode 701, a large pool of direct memory accessed data buffers 705 are allocated from the pinned heap. Infrastructure 710 is also allocated for issuing and completion I/O commands. This infrastructure includes SCSI structures 715 for using the SCSI interface, command pool 720 of I/O commands, and response pool 725 including standardized responses that are sent across Fibre Channel Interconnect 700 to other devices. Infrastructure 730 is allocated to handle link events that occur while the device is linked to Fibre Channel Interconnect 700. Full functioned interrupt handler 735 is allocated to handle interrupts that occur on Fibre Channel Interconnect 700. Process 740 is allocated to gather link statistics. Login information 745 is maintained to provide device connections with Fibre Channel Interconnect 700. Information is made concerning (i) other devices connected to the device, and (ii) other devices to which the device is connected. Finally, link 750, or laser light, is on so that the device can transmit over Fibre Channel Interconnect 700. With all functions allocated and operating, the device can receive request 755 from another device connected to Fibre Channel Interconnect 700 and has the resources available to process the request and send response 760 back to the other device.

At the other extreme, when a device is in closed state 703, no resources are allocated. Link 799, or the laser light, is off preventing any requests from reaching the device and, consequently, the device is unable to send any requests or responses to other devices through Fibre Channel Interconnect 700. When a device toggles between open mode 701 and closed mode 703, other devices connected to Fibre Channel Interconnect perform Fibre Channel re-initialization disrupting processing that occurs in other devices and disturbing the flow of data through Fibre Channel Interconnect 700.

Quasi-open mode 702 provides a minimal set of resources so that the device can receive request 790 and respond with rejection 795. In addition, link 788 (the laser light) is kept on so that other devices do not perform Fibre Channel re-initialization each time the device toggles between quasi-open mode 702 and open mode 701. In quasi-open mode 702, skeleton driver 775 is allocated. Skeleton driver 775 is capable of receiving and responding to Extended Link Services (ELS). However, skeleton driver 775 does not include the complete infrastructure allocated when the device was in open mode 701. Skeleton driver 775 also includes skeleton interrupt handler 780 to handle some interrupts that occur within Fibre Channel Interconnect 700. Skeleton interrupt handler 780 does not include all the features of full function interrupt handler that is allocated when the device is in open mode 701. Buffers. 785 are allocated to store a minimal set of direct memory accessed data buffers as needed to store synchronous ELS information.

In a preferred embodiment, once a link is established between the device and Fibre Channel Interconnect 700, the device only toggles between open mode 701 and quasi-open mode 702. In this manner, the link between the device and Fibre Channel Interconnect 700 is kept open preventing other devices from performing unnecessary Fibre Channel re-initialization every time the device toggles between closed state 703 and either open state 701 or quasi-open state 702.

Figure 8:
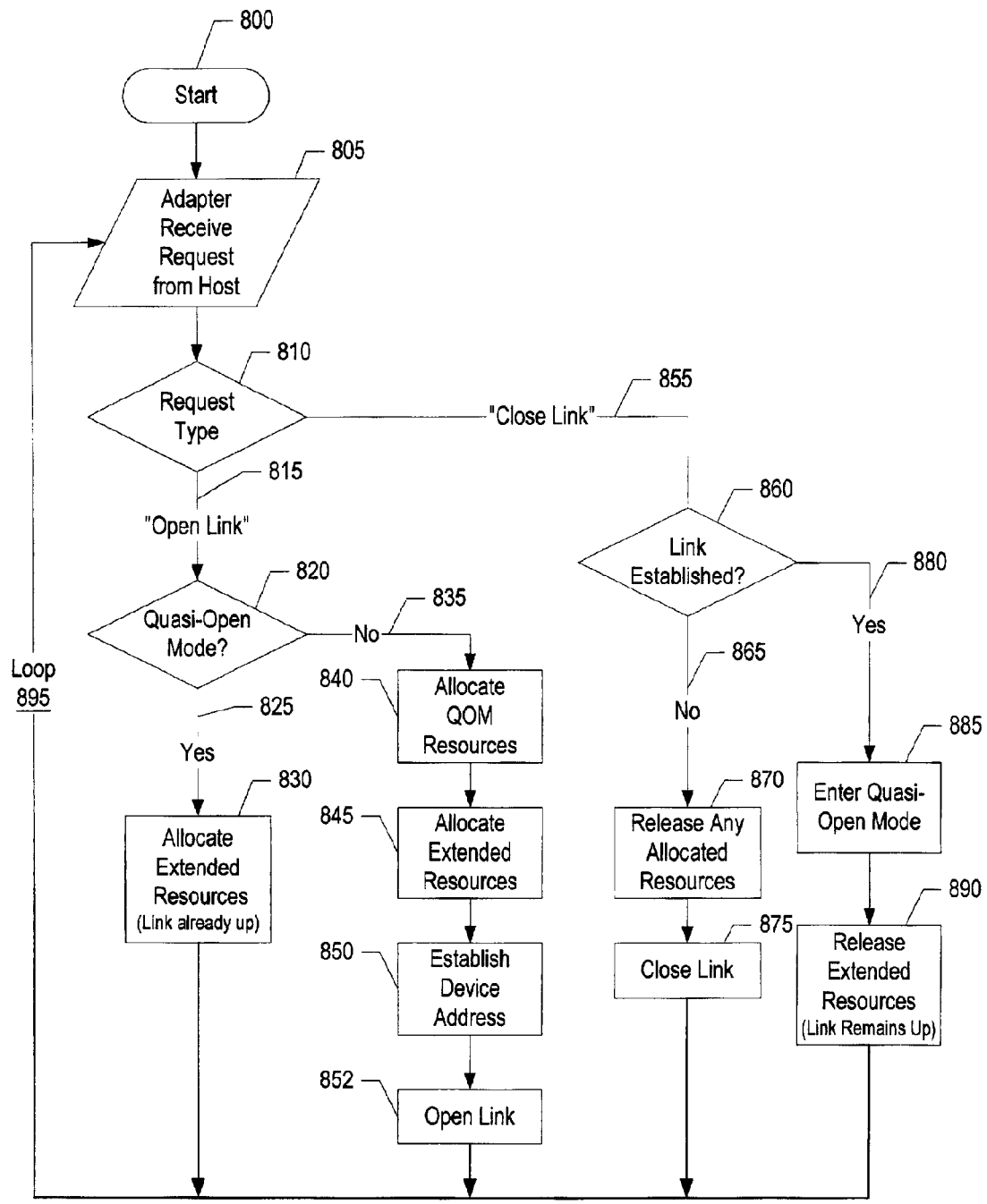
FIG. 8 is a flowchart of processing performed by an adapter when receiving open and close commands from a host device.

FIG. 8 shows a flowchart of processing performed by an adapter when receiving open and close commands from a host device. Processing commences at start 800. The adapter then receives a request from the host machine (input 805). The adapter determines what type of request has been received (decision 810). While more requests than "open link" and "close link" are possible, these two requests are shown in FIG. 8 because these requests cause a state change in the adapter. If an "open link" request was sent by the host, "open link" branch 815 is taken. The adapter determines the current state of the adapter (decision 820). If the adapter is in quasi-open mode, decision 820 branches to "yes" branch 825 whereupon extended resources are allocated (step 830). See FIG. 7 to contrast extended resources allocated in open mode 701 that are not allocated in quasi-open mode 702. Returning to FIG. 8, after extended resources have been allocated (the link is already established and therefore does not need to be opened), processing returns (loop 895)to receive the next request from the host (input 805).

If decision 820 determines that the adapter is not in quasi-open mode (i.e., the adapter is in a closed state), "no" branch 835 is taken whereupon all open mode resources are allocated and the link is opened. Quasi-open mode resources are allocated (step 840)(see FIG. 7, quasi-open mode 702, for details of allocated quasi-open mode resources). Extended resources are allocated (step 845). The sum of quasi-open mode resources and extended resources is the set of open mode resources 701 shown in FIG. 7. Returning to FIG. 8, since the adapter is in a closed state, a preferred device address is established (step 850) that will be used when the device is linked to the Fibre Channel interconnect. After a preferred device address is established, the device opens a link (step 852) onto the Fibre Channel. Because the link is new, other devices connected to the Fibre Channel will perform Fibre Channel re-initialization in response to the device being inserted into the Fibre Channel. However, once the device is successfully linked on the Channel, Fibre Channel re-initializations are rare because the adapter link (fiber optic light) is kept on rather than cycled during state changes. Processing then returns (loop 895)to receive the next request from the host (input 805).

If the host requested that the link be closed, decision 810 branches to "close link" branch 855. A determination is made concerning whether a link has been established with the Fibre Channel network (decision 860). If a link has not been established, "no" branch 865 is taken whereupon any allocated resources are released (step 870) and the link is closed (step 875). Processing then returns (loop 895)to receive the next request from the host (input 805).

On the other hand, if a link has been established, decision 860 branches to "yes" branch 880 whereupon the adapter enters quasi-open mode (step 885) and will respond with a "reject" message to any device that attempts to communicate with it. Extended resources are released (step 890)(see FIG. 7, quasi-open mode 702, for the minimal resources that are kept). Processing then returns (loop 895)to receive the next request from the host (input 805). In this manner, the adapter preferably toggles between open and quasi-open states once an initial link has been established with the Fibre Channel. Minimizing the state changes between "close" and either "open" or "quasi-open" reduces the number of Fibre Channel re-initializations that are performed and increases overall Channel and device efficiency.

Remote Activation for Quasi-Open Fibre Channel Devices

FIGS. 9–13 show a quasi-open device receiving remote activation commands and, alternatively, authenticating the wakeup, or activation, requestor prior to entering an open Fibre Channel state.

Figure 9:
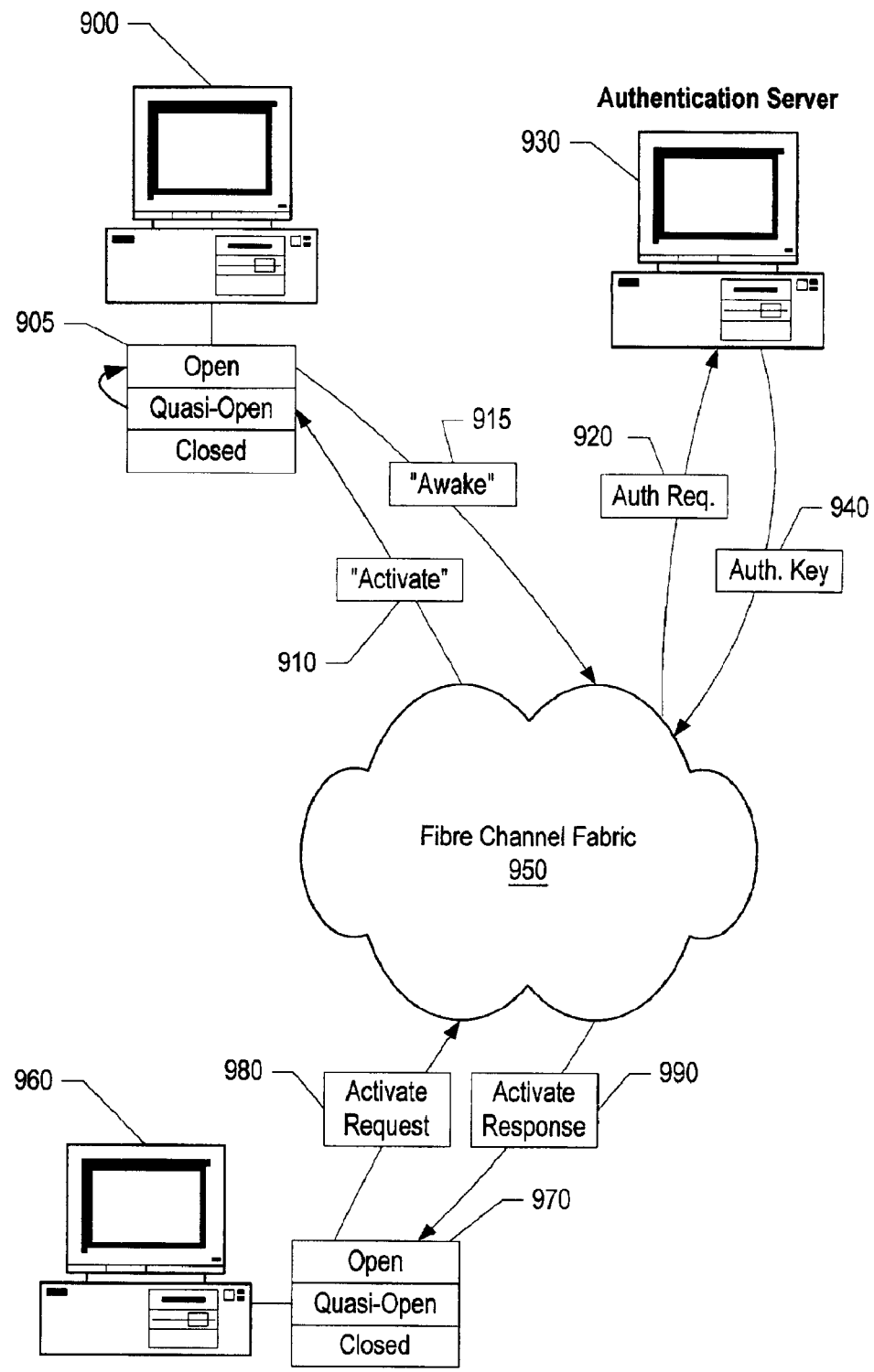
FIG. 9 shows a quasi-opened device receiving a activation request and an authentication server providing an authentication key.

FIG. 9 shows computer system 900 initially in quasi-open state 905. Computer system 900 receives activation command 910 sent from computer system 960. Computer system 960 requests the activation of the Fibre Channel adapter in computer system 900 by sending activation request 980 across Fibre Channel Fabric 950.

Because computer system 900 is in a quasi-open state, most requests are denied by returning a reject response to the requesting device. For a remote activation (or wakeup), however, computer system 960 sends special activation request 980 to computer system 900. Computer system 900 recognizes incoming activation request 910 and responds accordingly. In some implementations, computer system 900 sends activated response 915 to requestor computer system 960. Activated response 915 passes through Fibre Channel Fabric 950 and activated response 990 is received by requester computer system 960. Activated response 915 assists requestor computer system in sending further requests to computer system 900.

In some implantations, the Fibre Channel adapter in computer system 900 is activated whenever an activation request is received. However, due to security concerns, some implementations use an authentication scheme to ensure that an authorized computer system is sending the activation request. In one embodiment, authentication server 930 is at a predefined address on Fibre Channel fabric 950 (i.e., address 0xFFFFF7). Authentication server 930 provides authentication key 940 to other devices connected to Fibre Channel fabric 950. In this embodiment, the adapter in computer system 900 is only activated up when it receives an authenticated activation request. Non-authenticated activation requests are rejected similarly to the rejection of non-activation requests received while the adapter in the computer system is in a quasi-open state.

Other implementations for providing authentication use digital certificates issued by a trusted key issuer. Digital certificates are based on a type of security known as public key cryptography. Public key cryptography uses two keys: a public key and a private key. A digital certificate holds public keys for computer systems. The private key associated with the public key is held by the individual computers. An individual computer encrypts a message to a computer requesting activation of the computer's Fibre Channel adapter. The public key, accessible by the receiving computer, is used to decipher the incoming message. Because a message encrypted with a private key can only be deciphered using the public key, a successful decipher informs the receiving computer that the requesting computer is the true owner of the private key, hence the requesting computer is authenticated. This type of encrypting/deciphering is sometimes referred to as providing a "digital signature" because it authenticates the requester as being a particular computer system. In a public key—private key implementation, authentication server 930 receives authentication request 920 and responds by providing public key 940 corresponding to the computer being authenticated.

Figure 10:
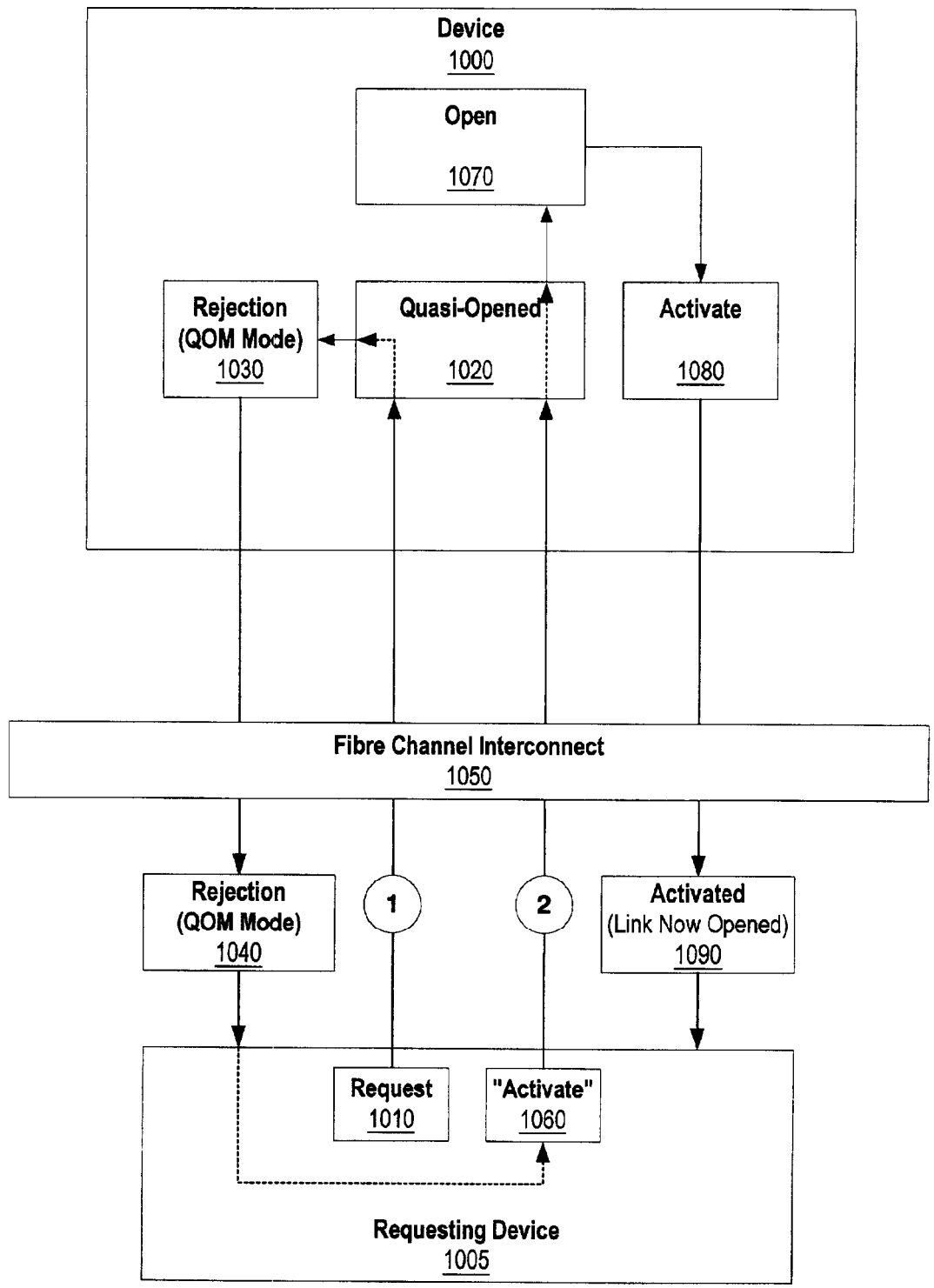
FIG. 10 shows a device issuing an activation command and causing an adapter in another device to transition from a quasi-open state to an opened state.

FIG. 10 shows command flow between quasi-open device 1000 and requesting device 1005. Requesting device 1005 first sends request 1010 through Fibre Channel Interconnect 1050 to device 1000. Because device 1000 is in quasi-open state operation 1020, device 1000 sends rejection 1030 back through Fibre Channel Interconnect 1050 to requesting device 1005. When requesting device 1005 receives rejection 1040, it may request that device 1000 activate its Fibre Channel adapter. In some implementations, rejection message 1040 that is received by requesting device 1005 includes information indicating that device 1000 is operating in a quasi-open mode. This information is used by requesting device 1005 to determine whether to attempt to activate the adapter in device 1000. When requesting device 1005 determines to issue activate command 1060. Activate request 1060 is sent through Fibre Channel Interconnect 1050 and received at device 1000. Quasi-open state operation 1020 recognizes activation request 1060 as a special request and performs necessary operations to enter open state operations 1070. In some implantations, device 1000 sends actived response 1080 through Fibre Channel Interconnect 1050 to requesting device 1005. Activation response 1090 received by requesting device 1005 informs the requesting device that device 1000 is now in an open state and normal requests can be issued to the device.

Figure 11:
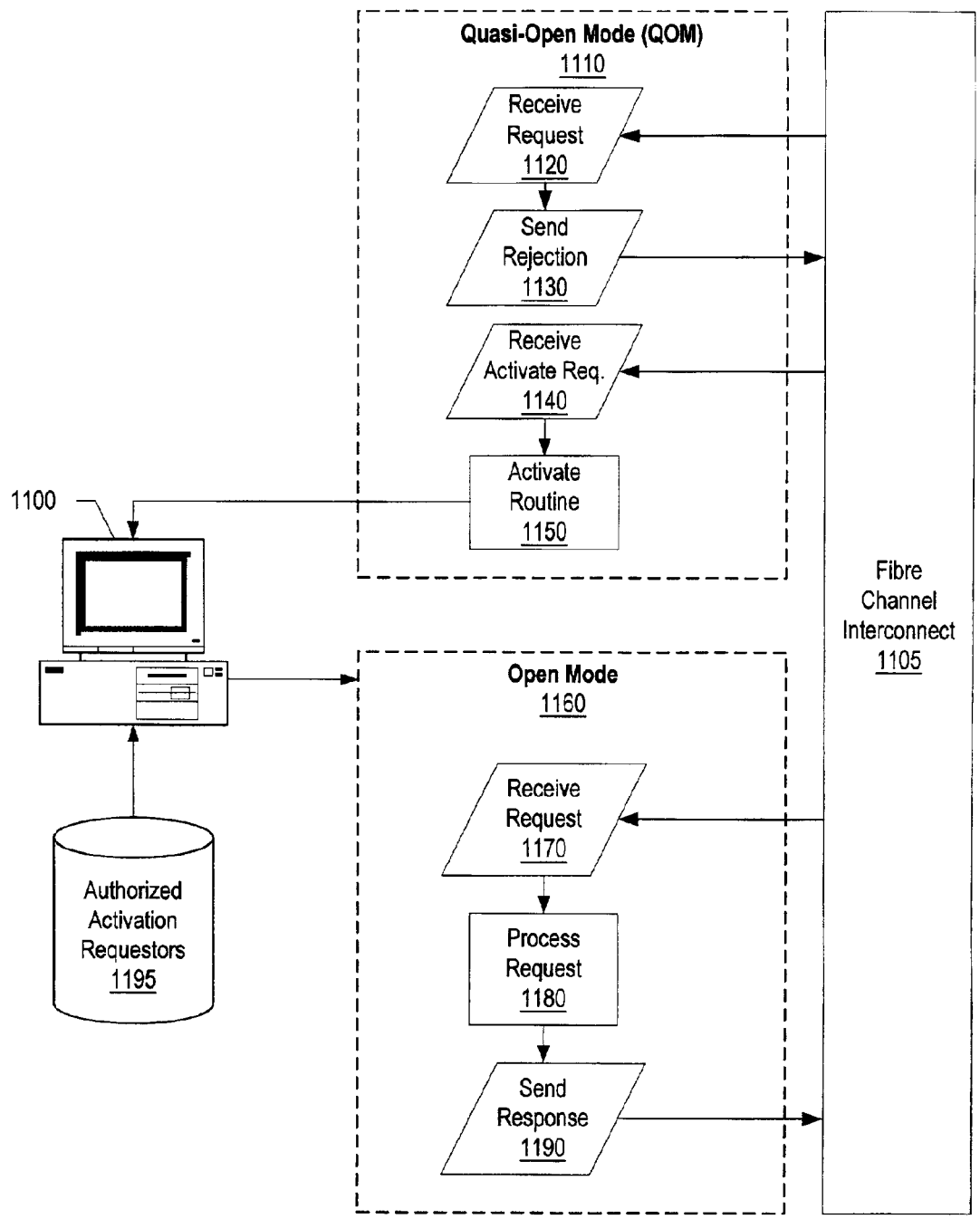
FIG. 11 shows processing performed by a device receiving an activation command in a quasi-open state.

FIG. 11 shows processing by device 1100 in moving from quasi-open mode 1110 to open mode 1160. While in quasi-open mode 1110, non-activation requests are received (input 1120) and summarily rejected (output 1130). A special activation command, on the other hand, is received (input 1140) causing the invocation of activation routine 1150. Device 1100, in turn, enters open mode 1160. While device 1160 is in open mode, requests are received (input 1170), processed (process 1180), and results are returned to the requester (output 1190).

In some implementations, activation requests that are received (at input 1140) are encrypted or include identification information about the requestor. Device 1100 can maintain authorized activation requestor list 1195 that checks whether an activation request is coming from an authorized requester. In order to ensure that the request is coming from an authorized requester, the activation request may be encrypted with the private key of the requester and deciphered using the public key of the requestor to verify the identity of the requestor. In another embodiment, an authentication server resides at a known address on Fibre Channel Interconnect 1105. The authentication server provides the address of authorized devices. The address of the activation requestor is compared with the authorized devices to determine if the requestor is authorized to activate the Fibre Channel adapter within device 1100. To provide further security, device 1100 may maintain a list of authorized activation requestors on nonvolatile storage device 1195. This list of authorized requestors can be compared with the address of the requestor to determine whether the requester is authorized to active device 1100.

Figure 12:
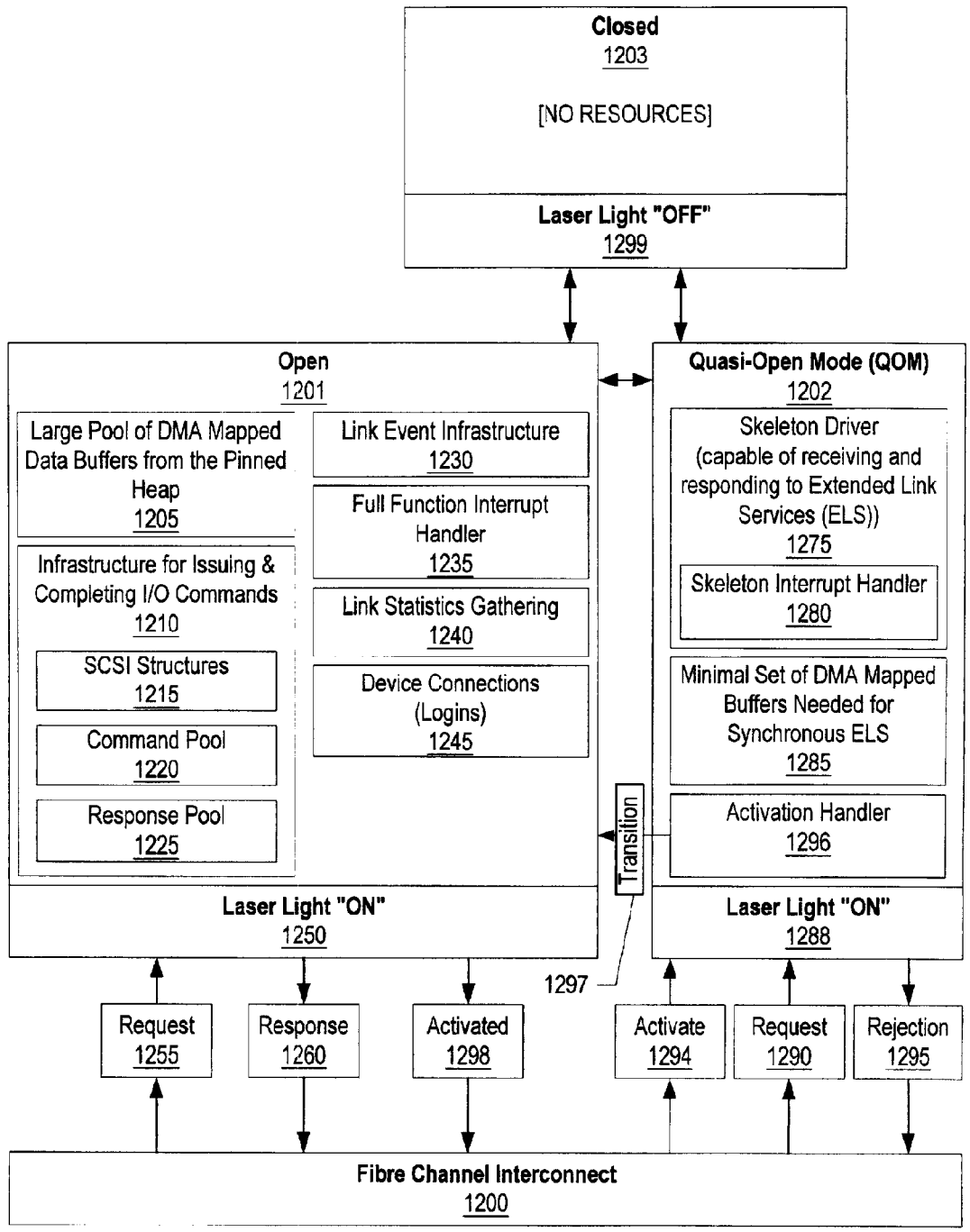
FIG. 12 is a block diagram of functions allocated by a device when in open, closed, and quasi-open states with an additional quasi-open state for handling activation commands.

FIG. 12 shows a block diagram of resources allocated by a device when in open state 1201, quasi-open state 1202, and closed state 1203. This diagram is substantially similar to the block diagram shown in FIG. 7. FIG. 12, however, shows the additional resources used to provide remote activation capabilities. Activation request 1294 is received by the device in quasi-open mode 1202. Activation request 1294 is handled as a special request and not summarily rejected as other requests while the device is operating in quasi-open mode 1202. Quasi-open mode includes activation handler 1296 programmed to handle the special activation request. Handling of the special activation request causes quasi-open state 1202 to transition (transfer 1297) to open state 1201. In some embodiments, open state 1201 sends activated response 1298 back to the requestor in order to inform the requestor that the device is ready to receive further requests.

Figure 13:
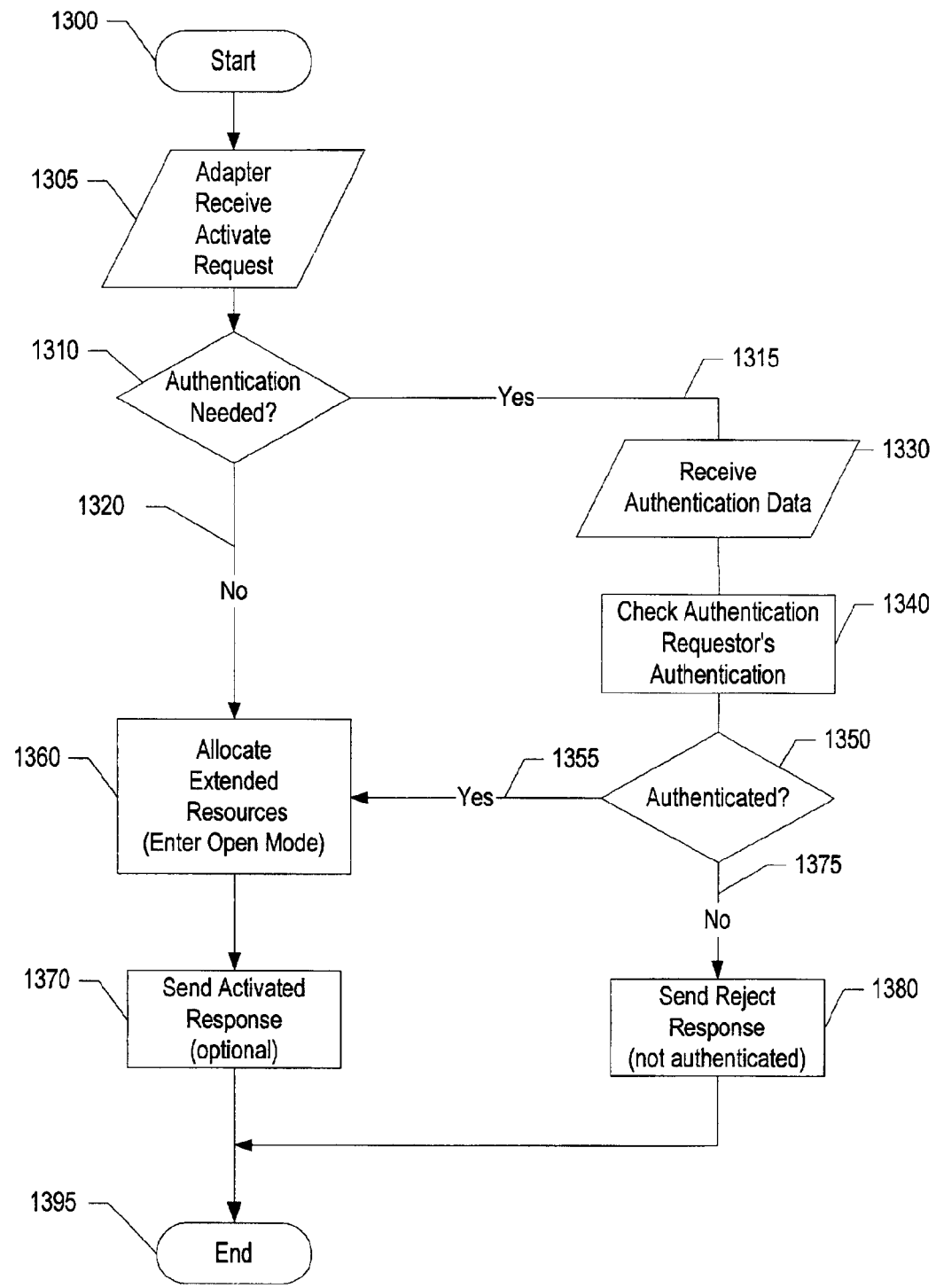
FIG. 13 is a flowchart of processing performed by an adapter when receiving an activation command from a Fibre Channel connected device.

FIG. 13 shows a flowchart depicting the logic used by a device in receiving and processing an activation request. Processing commences at 1300 with device being in a quasi-open state. The device receives an activation request from another device connected to the Fiber Channel fabric (input 1305). In some embodiments activation requests are automatically processed, while in other embodiments the activation request is authenticated prior to being processed (decision 1310). If the device is programmed to authenticate the activation request, decision 1310 branches to "yes" branch 1315. The device receives authentication data regarding the requesting device. In one embodiment, the authentication data is received from an authentication server that stores authentication data regarding devices connected to the Fibre Channel. In other embodiments, the authentication data is included in a digital certificate which was encrypted using the requesting device's private key. The device receives the requesting device's public key from a trusted third party, such as an authentication server. If the public key successfully deciphers the encrypted message, the identity of the requesting device is authenticated. The device then checks the requesting device's authorization or authentication (step 1340). In one embodiment, any requesting device that is authenticated is able to activate the Fibre Channel adapter in the device. In other embodiments, the requesting device must have sufficient authority, or privilege, to make the request. This check may be performed by checking a table of device addresses that are allowed to activate the device. If the device is authenticated and allowed to activation the adapter, decision 1350 branches to "yes" branch 1355 whereupon extended resources are allocated and the device enters open mode (step 1360). After the device enters open mode, an activated response (step 1370) may be returned to the requesting device informing the requesting device that the device is ready to process further requests. On the other hand, if the requesting device is either not authenticated or the requesting device is not allowed to activate the device, a rejection message is returned (step 1380) informing the requesting device that the activation request was not successful.

If authentication is not needed by the device, decision 1310 branches to "no" branch 1320 whereupon extended resources are allocated (step 1360) and an activated response message is returned (step 1370) to the requesting device without any further authentication processing.

After either a rejection response has been returned (step 1380) or the device has entered open mode (step 1360) and an optional activated response message has been sent (step 1370), processing terminates at end 1395.

Figure 14:
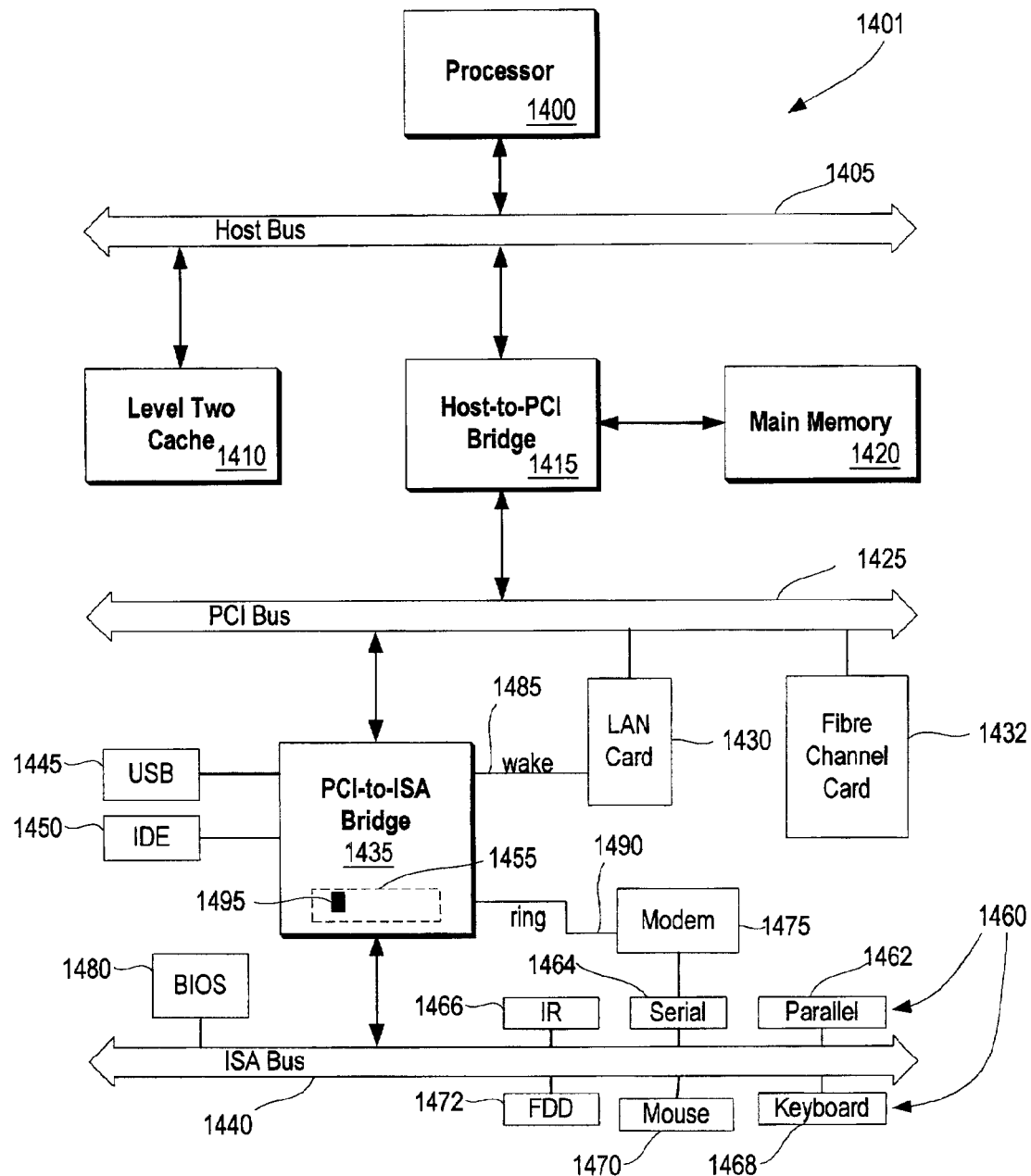
FIG. 14 is a block diagram of an information handling system capable of implementing the present invention.

FIG. 14 illustrates information handling system 1401 which is a simplified example of a computer system capable of performing the present invention. Computer system 1401 includes processor 1400 which is coupled to host bus 1405. A level two (L2) cache memory 1410 is also coupled to the host bus 1405. Host-to-PCI bridge 1415 is coupled to main memory 1420, includes cache memory and main memory control functions, and provides bus control to handle transfers among PCI bus 1425, processor 1400, L2 cache 1410, main memory 1420, and host bus 1405. PCI bus 1425 provides an interface for a variety of devices including, for example, LAN card 1430 and Fibre Channel Card 1432. PCI-to-ISA bridge 1435 provides bus control to handle transfers between PCI bus 1425 and ISA bus 1440, universal serial bus (USB) functionality 1445, IDE device functionality 1450, power management functionality 1455, and can include other functional elements not shown, such as a real-time clock (RTC), DMA control, interrupt support, and system management bus support. Peripheral devices and input/output (I/O) devices can be attached to various interfaces 1460 (e.g., parallel interface 1462, serial interface 1464, infrared (IR) interface 1466, keyboard interface 1468, mouse interface 1470, and fixed disk (FDD) 1472) coupled to ISA bus 1440. Alternatively, many I/O devices can be accommodated by a super I/O controller (not shown) attached to ISA bus 1440.

BIOS 1480 is coupled to ISA bus 1440, and incorporates the necessary processor executable code for a variety of low-level system functions and system boot functions. BIOS 1480 can be stored in any computer readable medium, including magnetic storage media, optical storage media, flash memory, random access memory, read only memory, and communications media conveying signals encoding the instructions (e.g., signals from a network). In order to attach computer system 1401 another computer system to copy files over a network, LAN card 1430 is coupled to PCI-to-ISA bridge 1435. Similarly, to connect computer system 1401 to an ISP to connect to the Internet using a telephone line connection, modem 1475 is connected to serial port 1464 and PCI-to-ISA Bridge 1435.

While the computer system described in FIG. 14 is capable of executing methods, or processes, described herein, this computer system is simply one example of a computer system. Those skilled in the art will appreciate that many other computer system designs are capable of performing the copying process described herein.

One of the preferred implementations of the invention is an application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for activating a Fibre Channel adapter, said method comprising:
   receiving an activation request from a requesting device;
   authenticating the requesting device, wherein the authenticating includes receiving an authentication key from an authentication server; and
   transitioning the adapter from a quasi-open state to an open state in response to the requesting device being authenticated.

2. The method as described in claim 1 further comprising:
   sending an activated response to the requesting device.

3. The method as described in claim 1 wherein the authenticating includes:
   receiving a message from the requesting device wherein the message is encrypted using a requesting device private key; and
   deciphering the message using a requesting device public key.

4. The method as described in claim 3 wherein the deciphering includes receiving the requesting device public key from the authentication server.

searching a list of authorized requesting devices;
   wherein the transitioning is further in response to the requesting device matching one of the authorized requesting devices.

5. The method as described in claim 1 further comprising:

6. An information handling system comprising:
   one or more processors;
   a memory accessible by the processors;
   a nonvolatile storage device accessible by the processors;
   a Fibre Channel adapter operable to connect the information handling system to a Fibre Channel network; and
   a Fibre Channel activation routine, the routine including:
      means for receiving an activation request from a requesting device;
      means for authenticating the requesting device, wherein the means for authenticating includes means for receiving an authentication key from an authentication server; and
      means for transitioning the adapter from a quasi-open state to an open state in response to receiving the requesting device being authenticated.

7. The information handling system as described in claim 6 further comprising:
   means for sending an activated response to the requesting device.

8. The information handling system as described in claim 6 wherein the means for authenticating includes:
   means for receiving a message from the requesting device wherein the message is encrypted using a requesting device private key; and
   means for deciphering the message using a requesting device public key.

9. The information handling system as described in claim 8 wherein the means for deciphering includes:
   means for receiving the requesting device public key from the authentication server.

10. The information handling system as described in claim 6 further comprising:
    means for searching a list of authorized requesting devices;
    wherein the transitioning is further in response to the requesting device matching one of the authorized requesting devices.

11. A computer program product for activating a Fibre Channel adapter, said computer program product comprising:
    means for receiving an activation request from a requesting device;
    means for authenticating the requesting device, wherein the means for authenticating includes means for receiving an authentication key from an authentication server;
    means for transitioning the adapter from a quasi-open state to an open state in response to the requesting device being authenticated.

12. The computer program product as described in claim 11 further comprising:
    means for sending an activated response to the requesting device.

13. The computer program product as described in claim 11 wherein the means for authenticating includes:
    means for receiving a message from the requesting device wherein the message is encrypted using a requesting device private key; and
    means for deciphering the message using a requesting device public key.

14. The computer program product as described in claim 13 wherein the deciphering includes receiving the requesting device public key from the authentication server.

* * * * *

UNITED STATES PATENT AND TRADEMARK OFFICE
CERTIFICATE OF CORRECTION

PATENT NO.   : 6,915,429 B1
DATED        : July 5, 2005
INVENTOR(S)  : Allen et al.

It is certified that error appears in the above-identified patent and that said Letters Patent is hereby corrected as shown below:

Column 7,
Line 53, please delete "shows and" and insert -- shows an --.

Column 15,
Line 67, please delete "searching a list of authorized requesting devices;".

Column 16,
Lines 1-3, please delete "wherein the transitioning is further in response to the requesting device matching one of the authorized requesting devices.".
Line 4, please add:
-- searching a list of authorized requesting devices;
    wherein the transitioning is further in response to the requesting device matching one of the authorized requesting devices. --.
Line 18, please delete "receiving".

Signed and Sealed this

Eighteenth Day of October, 2005

JON W. DUDAS
*Director of the United States Patent and Trademark Office*